(Model.)
W. MASON.
GATE.
No. 288,088. Patented Nov. 6, 1883.
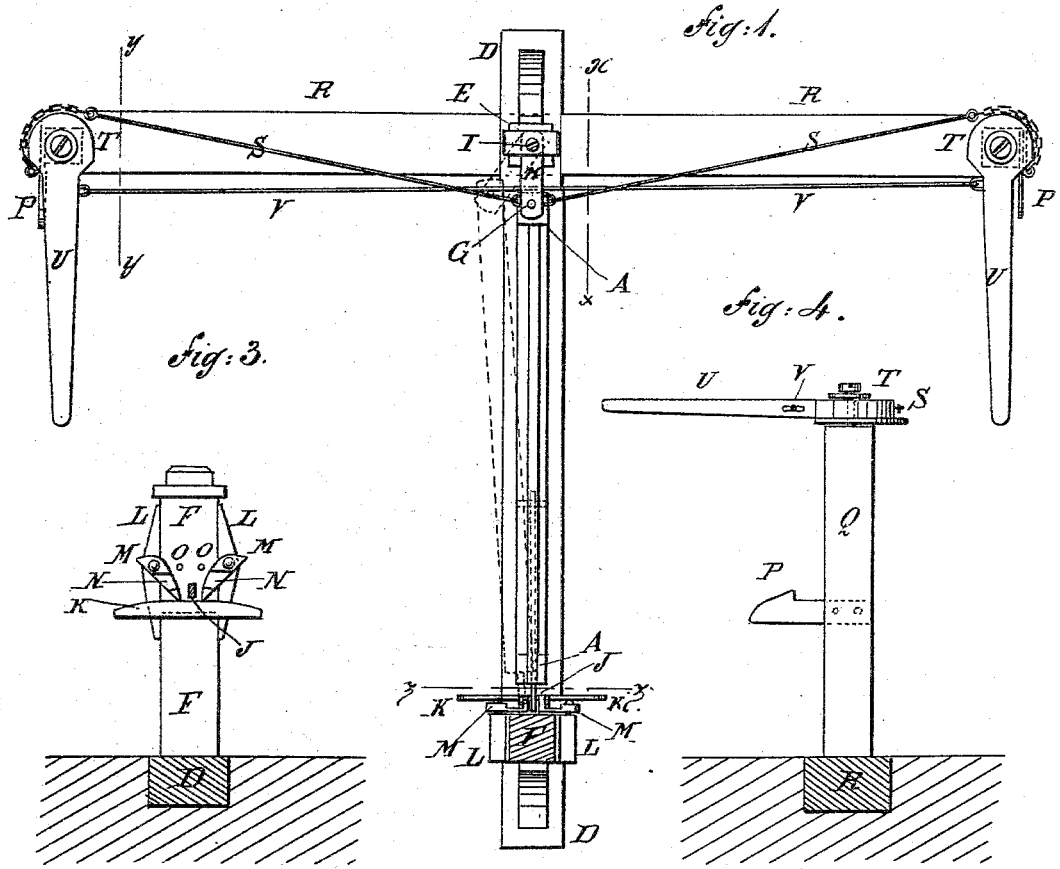
WITNESSES:
Chas. Nidd.
C. Sedgwick.
INVENTOR:
W. Mason
BY Munn & Co.
ATTORNEYS.

UNITED STATES PATENT OFFICE.

WILLIAM MASON, OF PUYALLUP, WASHINGTON TERRITORY.

GATE.

SPECIFICATION forming part of Letters Patent No. 288,08?, dated November 6, 183?.

Application filed May 4, 1883. (Model.)

*To all whom it may concern:*

Be it known that I, WILLIAM MASON, of Puyallup, in the county of Pierce and Territory of Washington, have invented a new and useful Improvement in Gates, of which the following is a full, clear, and exact description.

Reference is to be had to the accompanying drawings, forming a part of this specification, in which similar letters of reference indicate corresponding parts in all the figures.

Figure 1 is a plan view of my improvement. Fig. 2 is a side elevation of the same, partly in section, through the line $x\,x$, Fig. 1. Fig. 3 is a partly sectional elevation of a part of the same taken through the line $z\,z$, Fig. 1. Fig. 4 is a partly sectional elevation of a part of the same taken through the line $y\,y$, Fig. 1.

My invention relates to improvements in automatic gates; and it consists in the peculiar construction and arrangement of parts, as hereinafter fully described, and pointed out in the claim.

A represents the gate, which may be of any ordinary construction.

To the lower end of the rear upright of the gate A is attached, or upon it is formed, a pivot, B, which works in a socket or step bearing, C, supported by the bed piece or sill D, embedded in the ground beneath the gateway, to which, near its ends, are attached the rear post, E, and the front post, F.

To the upper end of the rear upright of the gate A is attached, or upon it is formed, a pivot, G, which works in a bearing in the forward end of the bar H. The bar H has a bearing in its rear end which works upon a pivot, I, attached to or formed upon the upper end of the rear post, E.

J is the latch, which is placed between two horizontal bars of the gate A, and is pivoted at its rear end to and between brace or cross bars of the said gate.

The forward end of the latch J projects at the forward end of the gate A, so as to come in contact with and slide along the curved upper side of the cross-bar K, attached to the inner side of the front post, F. To the post F, or to bearing-blocks L, attached to the sides of the said post, are pivoted the upper ends of two stop-latches, M, the lower ends of which rest upon the upper side of the cross-bar K, upon the opposite sides of and at a little distance from its center, so as to leave a space between the said inner ends for the end of the latch J. With this construction, when the gate is swung shut, the end of the latch J, as it slides along the cross-bar K, strikes against, raises and passes beneath the lower end of one of the latches M, and strikes against and is stopped by the other latch M, the end of the first latch M dropping behind the said latch J, preventing it from rebounding and fastening the gate shut.

In the forward sides of the stop-latches M, at a little distance above their lower ends, are formed notches N, for the end of the latch J to pass through, so that the gate can be opened by raising its forward end a little, and then swinging it to either side. The upward movements of the stop-latches M are limited by pins O, attached to the post F.

When the gate is swung open, it is held in place by one of the catches P, which are attached to posts Q, secured to the cross-sill R, the middle part of the said cross-sill being framed to the sill D near its rear end. The sills D R keep the posts E F Q always in their proper relative positions.

To the opposite sides of the forward part of the hinging-bar H are hinged the inner ends of two wires, S, the outer ends of which, or short chains secured to the said outer ends, are passed around and are attached to the cams T, formed upon or attached to the inner ends of the levers U, pivoted to the upper ends of posts set in the ground at the side of the roadway.

In the drawings the cam-levers T U are represented as being pivoted to the side latch-posts, Q; but in actual use they will be pivoted to posts at such a distance from the rear posts, E, that the horses and carriage will be out of the way of the swing of the gate when the said gate is being opened and closed by a person sitting in a carriage.

To the inner sides of the levers U are attached the ends of a connecting-wire, V.

With this construction, when a person approaching the gate draws the free end of a lever, U, toward him, the movement of the said lever causes the wire V to draw the free end of the other lever U inward, winding the end of the wire or chain S around the cam T of the said lever, and swinging the inner end of the hinging-bar H and the upper rear corner of the gate A from the operator, which raises the forward end of the gate A sufficiently to release the latch J from the stop-latches M, when the gate will swing open by its own weight in a direction from the operator. The operator can cause the gate to swing open toward himself by moving the free end of the lever U in the other direction. After the operator has passed through the gateway, he can close the gate by moving the free end of the other lever U outward.

I am aware that a bar pivoted to the post at a distance from its rear end equal to one-third of its length and connected to the gate has been connected at its opposite ends to two levers on each side of the gate by a series of crossed and straight rods; and I am also aware that a slotted bar pivoted to the gate-post at the center of its length, and connected to the gate by pins passing through the slot in a plate on the gate-post, has been connected at its opposite ends to a lever on each side of the gate by crossed rods, and I therefore do not claim such inventions.

Having thus fully described my invention, I claim as new and desire to secure by Letters Patent—

The combination, with the gate A and the rear post, E, of the swinging bar H, pivoted at its ends to the said gate and posts, respectively, the cam-levers T U, the wires S, connected to the forward end of the swinging bar and to the cam portions of the said levers, and the wire V, connected to the inner sides of the operating-levers, substantially as herein shown and described.

WILLIAM MASON.

Witnesses:
A. J. MILLER,
H. C. TEMPLE.